No. 753,332. PATENTED MAR. 1, 1904.
C. L. TURNER.
VALVE.
APPLICATION FILED FEB. 28, 1903.
NO MODEL.
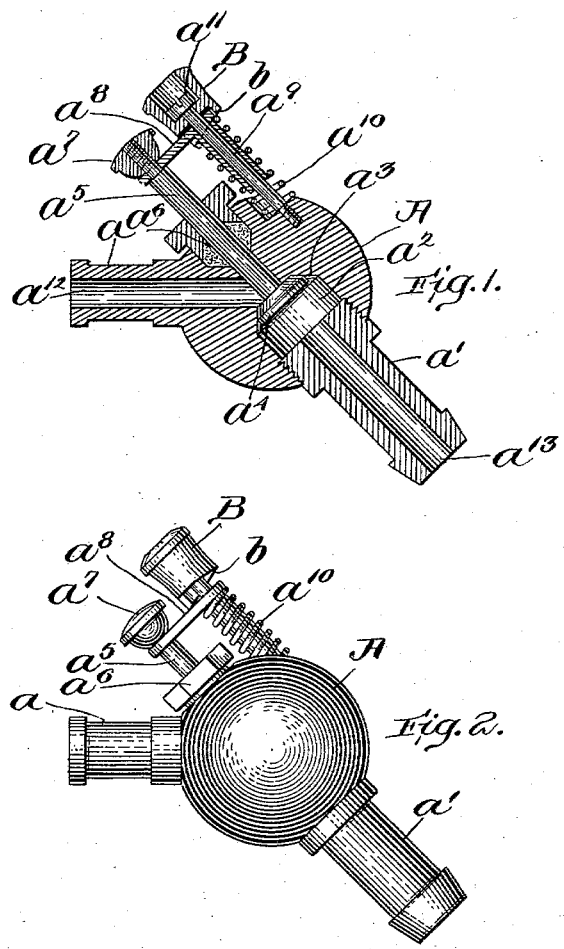
Witnesses:
Inventor:
Charles L. Turner,
by Roberts + Mitchell,
Attorneys.

No. 753,332.

Patented March 1, 1904.

UNITED STATES PATENT OFFICE.

CHARLES L. TURNER, OF WINTHROP, MASSACHUSETTS, ASSIGNOR TO RHODES LOCKWOOD, WILLIAM N. LOCKWOOD, AND RHODES G. LOCKWOOD, COPARTNERS DOING BUSINESS AS DAVIDSON RUBBER COMPANY, OF BOSTON, MASSACHUSETTS.

VALVE.

SPECIFICATION forming part of Letters Patent No. 753,332, dated March 1, 1904.

Application filed February 28, 1903. Serial No. 145,561. (No model.)

*To all whom it may concern:*

Be it known that I, CHARLES L. TURNER, a citizen of the United States, and a resident of Winthrop, in the county of Suffolk and State of Massachusetts, have invented new and useful Improvements in Valves, of which the following is a specification.

My invention relates to valves, and has for its object to provide an improved valve of simple construction which may be held, controlled, and operated by the one hand of a person, and thus leave the other hand free to be used for other purposes.

Also my invention has for its object to provide a valve of this character which may be locked in any desired open position.

To attain these ends, my improved valve is made to comprise in its construction a casing in the form of a handle adapted to be inclosed in one hand, through which a port is provided controlled by a valve whose stem extends to the exterior of the casing. The outer end of the stem is adapted to be engaged by the thumb of the hand holding the valve, by which it is depressed to open the valve, and a spring is provided for acting on the valve in the opposite direction to close it when the pressure of the thumb is removed.

In the preferred embodiment of my invention, as herein shown, my improved valve also comprises a cam-abutment opposed to the spring for holding the valve open to any desired extent within the range of the graduations of the abutment, means being provided to effect relative rotary movement between the stem and abutment to throw the latter into and out of action—as, for example, by rotating the abutment—so that when the valve is to be locked open the cam-abutment may be adjusted to accord with the desired open position of the valve and will hold the valve in that position.

In the accompanying drawings, which illustrate the preferred embodiment of my invention, Figure 1 is a central longitudinal section of a valve constructed in accordance with my invention, and Fig. 2 is an elevation of the valve shown in Fig. 1.

Having reference to the drawings, A represents the casing of my improved valve, which is so made exteriorly and proportioned in size as to constitute a handle adapted to be inclosed by the hand of the user, and for this reason the body is made globular or spherical, as shown, to provide an exterior which will comfortably fit the interior of the hand that is closed on it.

The body A is provided with an integral coupling member $a$ and also with a coupling member $a'$, made as a separate plug exteriorly threaded at one end to engage the threads of an interiorly-screw-threaded chamber $a^2$, provided in the body into which it is fitted. This chamber $a^2$ is made at its inner end with a valve-seat $a^3$ for a valve $a^4$, also arranged within said chamber. The valve $a^4$ is fast on the end of a stem $a^5$, extending through a stuffing-box $a^6$ to the exterior of the body, and at its outer end the stem $a^5$ carries a thumb-piece $a^7$, in the form of a nut screwed onto the reduced threaded outer end of the stem $a^5$.

The body A is bored or cored to provide a duct $a^{12}$, and the coupling member $a'$ is also cored or bored to provide a duct $a^{13}$, and these two ducts, together with chamber $a^2$, constitute a port through the valve-casing, which is controlled by the valve $a^4$. It will be observed that the axis of the valve $a^4$ and its stem are in alinement with the axis of chamber $a^2$, whereby in assembling the parts the valve and its stem are enabled to be placed in position through the open mouth of chamber $a^2$ before coupling member $a'$ is put in place, and, moreover, all of the ducts and the chamber can be made by straight bores or straight cores, so that there is but one very slight angle in the port to resist the passage of the fluid therethrough.

Fast on stem $a^5$ is an arm $a^8$, held in place by thumb-piece $a^7$, and the outer end of this arm is mounted to slide freely on a pin $a^9$ alongside and parallel to stem $a^5$ and fastened to the casing A by having one end thereof threaded and screwed into said body. Between the arm $a^8$ and the casing A is interposed a spring $a^{10}$, surrounding the pin $a^9$.

When my improved valve is in use, the body A is grasped in the hand with the thumb resting on the thumb-piece $a^7$. To open the valve, the thumb is depressed, thus opening the valve and carrying the outer end of arm $a^8$ down along the pin $a^9$ and compressing the spring $a^{10}$. To close the valve, the pressure of the thumb is removed and the spring $a^{10}$, acting on the arm $a^8$, returns the valve $a^4$ onto its seat $a^3$.

To provide for locking the valve in any desired open position within the limits of its capacity, I employ a cam B, (herein shown as a spiral cam,) mounted loosely on pin $a^9$ and adapted to be rotated by hand to adjust its graduated face $b$ relatively to the outer end of the arm $a^8$, with which it coöperates, said face $b$ engaging that side of arm $a^8$ opposite spring $a^{10}$. Back of the adjustable graduated abutment B the pin $a^9$ is provided with a head $a^{11}$, which limits movement of abutment B in that direction. By making the abutment B as a spiral cam instead of using any of the other alternative constructions which, as will now be obvious, might be substituted in lieu thereof, the abutment besides performing the functions of a graduated abutment is also capable of being used to operate the valve—that is, it may be used both as a graduated abutment and as a valve-operating cam, whereby the act of adjustment serves also to open the valve.

Of course, as will be clear, adjustability of the abutment is only one of other obvious mechanical measures for effecting relative rotary movement between the graduated abutment and the stem of the valve, and of course also it is not essential that the abutment be a cam, as the main feature of my improved valve resides in the construction whereby the valve-casing or body of the valve is made to serve as a handle and the valve is normally free to be opened and controlled by the pressure of one finger of that hand engaging the stem thereof without interference from the graduated abutment.

My improved valve construction, as above described, is especially adapted to be used as part of a syringe or douche or like surgical instrument where ease of manipulation and control is of prime importance, and as my improved valve can be held and operated and controlled by one hand, thus leaving the other hand free for other purposes, its value when used in this connection will be appreciated by all skilled in the art.

What I claim is—

1. The improved valve above described comprising a casing adapted to be grasped by one hand; a port through the casing; a valve for controlling said port, having its stem extended to the exterior of the casing to constitute a handle free to be directly engaged and depressed by the same hand, to open the valve; a spring for holding the valve normally closed; a normally inoperative graduated abutment adapted to act on said valve-stem in opposition to the spring, and means to effect relative rotary movement between the stem of the valve and the abutment when it is desired to cause the abutment to hold the valve open.

2. The improved valve above described comprising a casing adapted to be grasped by one hand; a port through the casing; a valve for controlling said port, having its stem extended to the exterior of the casing to constitute a handle free to be directly engaged and depressed by the same hand, to open the valve; a spring for holding the valve normally closed; a normally inoperative graduated abutment adapted to act on said valve-stem at a point between the ends of the latter and in opposition to said spring, and means to effect relative rotary movement between the stem of the valve and the abutment when it is desired to cause the abutment to hold the valve open.

3. The improved valve above described comprising a casing adapted to be grasped by one hand; a port through the casing; a valve for controlling said port having its stem extended to the exterior of the casing and adapted to be depressed by the same hand, to open the valve; an arm fast at one end to the stem; a headed pin projecting from the casing alongside the valve-stem on which the other end of the arm is loosely mounted; a spring on said pin between said arm and the valve-casing, and an adjustable graduated cam abutment mounted on the pin and adapted to act on the arm in opposition to said spring.

Signed by me at Boston, Massachusetts, this 26th day of February, 1903.

CHARLES L. TURNER.

Witnesses:
OLIVER R. MITCHELL,
CHARLES S. THURSTON.